(12) United States Patent
Kauffman et al.

(10) Patent No.: US 6,911,263 B2
(45) Date of Patent: Jun. 28, 2005

(54) PET WEAR LAYER/SOL GEL TOP COAT LAYER COMPOSITES

(75) Inventors: William J. Kauffman, Manheim, PA (US); Gary A. Sigel, Millersville, PA (US)

(73) Assignee: AWI Licensing Company, Wilmington, DE (US)

( * ) Notice: Subject to any disclaimer, the term of this patent is extended or adjusted under 35 U.S.C. 154(b) by 196 days.

(21) Appl. No.: 10/060,487

(22) Filed: Jan. 30, 2002

(65) Prior Publication Data

US 2003/0144469 A1 Jul. 31, 2003

(51) Int. Cl.$^7$ ............................................. B32B 27/36
(52) U.S. Cl. ...................... 428/447; 428/446; 428/480; 427/387; 427/412.5
(58) Field of Search ................................ 428/447, 446, 428/480; 427/387, 412.5

(56) References Cited

U.S. PATENT DOCUMENTS

| | | | | |
|---|---|---|---|---|
| 4,348,462 | A | | 9/1982 | Chung ........................ 428/412 |
| 4,822,828 | A | | 4/1989 | Swofford ...................... 522/84 |
| 5,077,112 | A | * | 12/1991 | Hensel et al. .................. 428/76 |
| 6,238,798 | B1 | * | 5/2001 | Kang et al. .................. 428/421 |
| 2002/0150779 | A1 | * | 10/2002 | Ward et al. .................. 428/480 |
| 2002/0160680 | A1 | * | 10/2002 | Laurence et al. ............ 442/394 |

FOREIGN PATENT DOCUMENTS

| | | | |
|---|---|---|---|
| WO | WO 98/46692 | 10/1998 | ......... C09D/183/06 |
| WO | WO 01/00406 | 1/2001 | ........... B32B/27/18 |

OTHER PUBLICATIONS

European Search Report Communication—Application No. EP 03 00 1329 dated Sep. 28, 2004.
Patent Abstracts of Japan—Publication No. 08174783 dated Jul. 9, 1996.

* cited by examiner

*Primary Examiner*—James J. Seidleck
*Assistant Examiner*—Melanie Bissett

(57) ABSTRACT

Composite wear layers that include a polyethylene terephthalate wear layer adhered to an organic/inorganic (O/I) top coat layer, and surface coverings and surface covering components including the composite wear layers, are disclosed. The organic/inorganic top coat layer is formed from a top coat formulation that comprises a coupling agent that includes an organic polymerizable moiety such as epoxy, acrylate and the like, as well as an inorganic polymerizable moiety such as a silanol. The wear layer is typically in the range of about 1–20 mils thickness, and the top coat layer is typically in the range of 2 microns to 0.5 mils thickness. The composite wear layers can be included in surface coverings or surface covering components, such as floor and wall coverings. An adhesion promoter/binder can be used to better adhere the polyethylene terephthalate wear layer to the organic/inorganic top coat layer.

36 Claims, 2 Drawing Sheets

PET WEAR LAYER/SOL GEL TOP COAT LAYER COMPOSITES

FIELD OF THE INVENTION

The present invention relates generally to composite wear layers for surface coverings. In particular, the invention relates to a composite wear layer for a surface covering, composite comprises a polyethylene terephthalate (PET) wear layer adhered to an organic/inorganic top coat layer.

BACKGROUND

The flooring industry has been working to develop wear layer systems and flooring products incorporating these systems which provide excellent gloss retention & scratch resistance. For non-residential (commercial) flooring applications such as use in schools, hospitals, stores, etc. wherein the composite wear layer must also provide excellent color stability over the lifetime of the product due to exposure to light and as well as excellent stain resistance from foot traffic conditions. Additionally, the composite wear layer must also be compatible with maintenance materials that can be applied after some wearing of the composite wear layer occurs.

U.S. Pat. No. 5,120,811, the contents of which are hereby incorporated by reference, discloses using organic/inorganic (O/I) top coat layers which provide stain and gloss protection when applied over a clear, protective layer. However, the '811 patent does not describe composites incorporating the organic/inorganic top coat layer with a composite wear layer so that it can be used in commercial flooring applications as well as residential applications.

Current compositions and methods fail to provide top coat layers, and flooring products incorporating the top coat layers, which fully satisfy the foregoing criteria. Accordingly, a need exists for such flooring.

SUMMARY OF THE INVENTION

Composite wear layers that comprise a polyethylene terephthalate wear layer adhered to an organic/inorganic top coat layer, and surface coverings and surface covering components comprising the wear layers, are disclosed. The organic/inorganic top coat layer is formed from a top coat formulation which includes a coupling agent. The coupling agent is a molecule which includes an organic polymerizable moiety such as epoxy, acrylate and the like, as well as an inorganic polymerizable moiety such as a silanol. Top coat layers formed from the top coat formulation have both organic and inorganic character. Although not limited to these thickness ranges, the wear layer is typically in the range of about 1–20 mils thickness, and the top coat layer is typically in the range of about 2 microns to about 0.5 mils thickness.

The composite wear layers can be included in surface coverings or surface covering components, such as floor and wall coverings. The surface coverings can include additional layers, for example, a substrate, a design layer, a foam layer and the like, directly or indirectly underlying the wear layer. Ideally, any layer directly underlying the polyethylene terephthalate wear layer adheres well to the wear layer.

In some embodiments, an adhesion promoter/binder is included to better adhere the polyethylene terephthalate wear layer to the organic/inorganic top coat layer. Adhesion promoters are well known to those of skill in the art, and any adhesion promoter that adequately adheres the top coat layer to the wear layer can be used. In some embodiments, hard particles, for example, aluminum oxide particles, are included in the top coat layer.

The present invention, and embodiments thereof, are described in more detail below. Although the present invention has been described with reference to certain embodiments, other embodiments may achieve similar results and advantages. Variations and modifications of the present invention will be apparent to one skilled in the art and the disclosure herein is intended to cover all such modifications and equivalents.

DETAILED DESCRIPTION OF THE INVENTION

Figure 1:
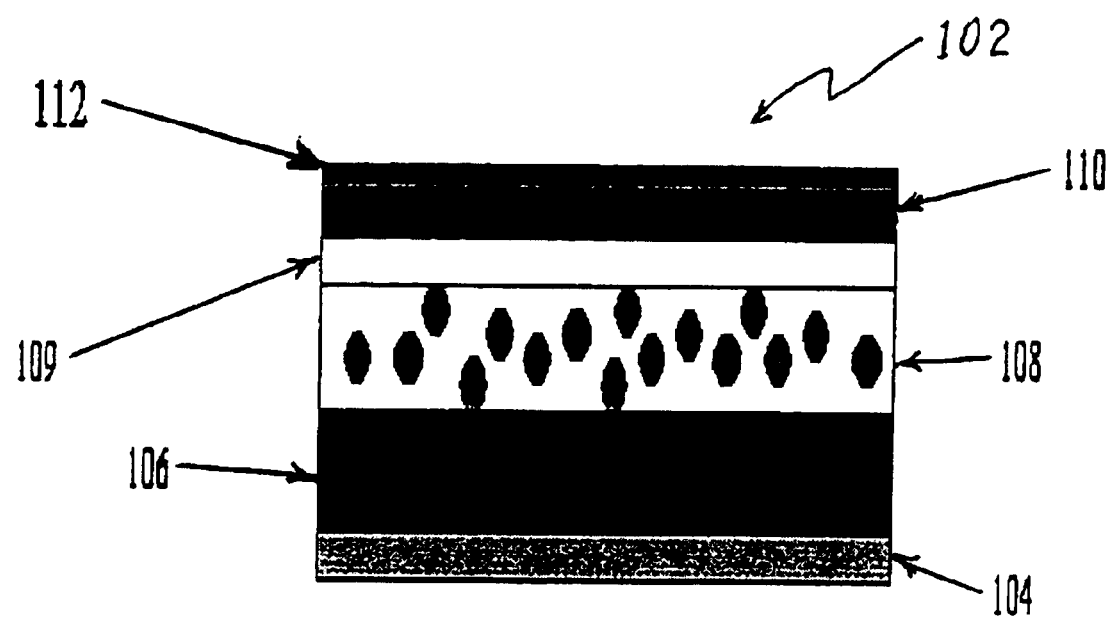
FIGS. 1 and 2 are cross-sectional views of two embodiments of the floor product described herein.

The present invention provides a solution to the problem of providing top coat layers and surface coverings with excellent gloss retention and scratch resistance, as well as excellent light stability and stain resistance. The solution is in the form of composite wear/top coat layers, where the wear layer is a polyethylene terephthalate (PET) film and the top coat layer is an organic/inorganic polymer, where there is adequate interlayer adhesion between the top coat and the wear layers. The composite wear/top coat layers can be included in surface coverings and surface covering components. In one embodiment, the surface covering includes a substrate, a PET wear layer and an organic/inorganic top coat layer adhered to the PET layer.

The present invention advances building and flooring materials art by providing a hard wear surface with excellent light stability, stain resistance and gloss protection which can be bonded over a PET wear layer. Since these transparent polymer/glass (organic/inorganic) compositions can be applied over clear, protective layers, there can be a wide range of applications for a wear surface which will not detract from the appearance of the support or surface being protected.

The inorganic/organic hybrids have advantages in that they can be applied as relatively thin coatings (about 0.1–0.5 mils), require modest cure energy, and exhibit outstanding performance as wear surfaces in flooring applications. Coating thicknesses of about 2–4 microns have proven to be especially outstanding in physical property tests when applied over flooring substrates. The top coat layers are typically very hard, with MOHS hardness ratings of about 1.75-4. While the hardness is typically less than that of ceramic surfaces, the hardness tends to be higher than normal "hard" polymers such as polymethyl methacrylate (PMMA), which has a MOHS hardness of 1.50. Top coat layers which are between about 13 microns and about 2 microns thick can have stain resistance and wear retention which rivals ceramic tile.

It is important that in surface coverings and surface covering components including the wear layer and a substrate layer and/or a top coat layer, there is adequate interlayer adhesion to the underlying substrate layer and/or overlying top coat layer. As used herein, the organic/inorganic top coat layer is adequately adhered to the PET wear layer when the composite 1) passes cross hatch adhesion, a standard test—ASTM D-3359, and 2) the top coat layer does not release from the wear layer when abraded, i.e., when walked upon and scratched as described in U.S. Pat. Nos. 5,843,576; 5,663,003; and 5,188,876.

Polyethylene Terephthalate (PET)

Polyethylene terephthalate is a well known polymer. When used to form the composite layers described herein, it is typically applied in the form of a film, optionally coated with an adhesion promoter to promote adhesion to a substrate and/or to the organic/inorganic top coat layer. Suitable PET films can be obtained from several sources which include Mitubishi Polyester Films LLC, and Dupont Teijin Films. Additionally, PET copolymer films can also be used, such as PETG. Copolymer films can be used as long as the majority of the film composition comprises PET units. These films can be used in thicknesses of about 1 to 20 mils and should be sufficiently transparent to see the design and color of the flooring substrate below. Suitable PET films which have been evaluated include Melinex 617/500, Melinex 725/500 and Melinex 582/400) (all from Dupont Teijin Films), where the 500 and 400 relate to different thicknesses of the PET film (5 and 4 mils respectively), and the 617, 725 and 582 relate to relate to the adhesion promoter used.

Adhesion Promoters

In some embodiments, no adhesion promoter is required to adhere the PET wear layer to the organic/inorganic top coat layer. While not wishing to be bound by a particular theory, it is believed that residual reactive functional groups on the PET wear layer form can form bonds with the organic/inorganic top coat layer as the top coat layer is cured (i.e., polymerized). However, in some embodiments, it may be advisable to use an adhesion promoter to provide adequate interlayer adhesion between the wear layer and the top coat layer.

Any adhesion promoter commonly used to adhere top coat layers and wear layers can be used. Such adhesion promoters are well known to those of skill in the art and need not be discussed in depth here. DUPONT TEIJIN FILM's 725, 582, 6445 and 617 primers are examples of acceptable primers that can be used depending upon the organic/inorganic top coating composition. Additionally, primers may also be used on the other side of the PET film to improve adhesion to the flooring substrate.

Top Coat Formulation

The top coat formulation includes at least a coupling agent as defined herein, and can include an organic polymerizable monomer and/or oligomer, an inorganic polymerizable monomer, an appropriate solvent (typically an alcoholic solvent, such as methanol, ethanol, isopropyl alcohol, propyl alcohol, and mixtures thereof.), and a polymerization initiator, for example, a photoinitiator. The formulation can also include hard particles, nanoparticles, surfactants, suspending and wetting agents, defoamers, etc., and other components typically found in top coat layers. Other polymerization initiators can be used independently or in combination with photoinitiators. These can include thermally-generated free radical initiators such as peroxides, peresters, etc., as well as cationic or anionic catalysts which can polymerize the organic moiety of the coupling agent and/or the organic polymerizable monomer. Additionally, compositions that can be cured by e-beam can be formulated without the need for initiators.

The top coat formulation can also include monomers with organic polymerizable groups, for example, reactive diluents such as (meth)acrylates, epoxy resins, vinyl ethers, and the like. When these monomers are polymerized, they become incorporated into the organic/inorganic layer along with the coupling agent.

The formulations can contain four components: (1) a poly alkyl metal oxide, e.g. tetraalkylorthosilicate (or tetraalkoxysilane), a hydrolyzed version thereof and/or a partially hydrolyzed version thereof, (2) a metal alkoxide coupling agent, a hydrolyzed version thereof and/or a partially hydrolyzed version thereof, (3) an organic functional group-containing (for example, epoxy and/or olefin-containing) polymerizable monomer and appropriate polymerization initiator, and, optionally, (4) a surfactant, for example, a nonionic surfactant such as a silicone surfactant. Poly metal oxides have the formula M(OR)n, where R is, independently, an alkyl group, and where alkyl is a straight, branched or cyclic alkyl group, typically with between 1 and 10 carbon atoms, and n is equal or greater than 3.

The top coat layer can be prepared from the formulation using virtually any thin film application method, dried and cured. The resulting hybrid film includes a chemically bonded metal oxide phase and polymer phase. Examples of compositions and methods for forming an organic/inorganic top coat layer are described, for example, in U.S. Pat. No. 5,120,811 to Glotfelter et al., the contents of which are hereby incorporated by reference in their entirety. Additionally, other examples of organic/inorganic top coat compositions include those types described in U.S. Pat. Nos. 5,679,458; 5,647,941; 5,233,006; 5399,738; 5,414,093; 5,674,964; 5,559,163; 4,644,077; 5,559,163; and 5,023,140, the contents of which are hereby incorporated by reference in their entirety.

In one embodiment, the top coat formulation includes:

(a) an acid hydrolyzed tetraalkyl orthosilicate;

(b) an acid hydrolyzed silane-containing coupling agent;

(c) a difunctional organic-functional monomer with one or more olefinic and/or epoxy groups; and (d) a photoinitiator.

One example of a composition of this type is:

(a) about 10 to about 70% of an acid-catalyzed hydrolysis product of at least one silicate selected from tetramethylorthosilicate (TMOS), tetraethylorthosilicate (TEOS) and tetrapropylorthosilicate (TPOS);

(b) about 1 to about 70% acid-catalyzed epoxy/silane coupling agent;

(c) about 1 to about 70% of a difunctional, cycloaliphatic epoxy monomer having at least one cyclohexene oxide functionality;

(d) about 0.5 to about 10% of an photoinitiator capable of initiating ring-opening, cationic photopolymerization of (c); and (e) about 0.1 to about 1% of a surfactant, for example, a poly(dimethylsiloxane) surfactant.

The individual components of the top coat formulation are discussed in more detail below.

Coupling Agent

The coupling agent includes one or more organic polymerizable moieties and one or more inorganic polymerizable moieties. The coupling agent can include, for example, two metal alkoxide moieties (upon acid hydrolysis) and two organic moieties. Additionally, the coupling agent can include three metal alkoxide moieties and one organic moiety. The hydrolysis product of the metal alkoxides polymerize to provide the top coat layer with inorganic character, and the organic polymerizable moieties can be polymerized to provide the top coat layer with organic character. Examples of metal alkoxide moieties include aluminum alkoxide, zirconium alkoxide, silicon alkoxide and titanium alkoxide moieties. The coupling agents can be dialkoxysilanes, trialkoxysilanes, and the like (and hydrolyzed or partially hydrolyzed versions thereof), provided they also include the organic polymerizable moieties.

The coupling agents can be derived from a number of readily available multi-functional organic compounds (i.e., compounds with functional groups, such as hydroxy, thiol, amine, carboxy, isocyanato, epoxy, (meth)acrylate, and the like). It is important that these functional groups can either polymerize/react with each other or polymerize/react with the polymerizable organic monomer which may be present in the formulation.

There are a number of commercially available silane coupling agents with polymerizable functional groups. Examples include acrylates, methacrylates and epoxides which contain silanes. Examples of epoxy groups include glycidyl ether and cycloaliphatic oxides. One example of an epoxy silane coupling agent is 3-glycidoxypropyltrimethoxy silane.

Inorganic Polymerizable Monomer

The inorganic polymerizable monomer is any inorganic moiety which can be polymerized to form an inorganic polymer. As used herein, an inorganic polymerizable moiety is a polymerizable group which, when polymerized, forms an inorganic polymer such as a glass. When present on the coupling agent, the moiety incorporates the coupling agent into a glass layer and/or forms a glass layer.

Silanols are an example of a metal oxide inorganic polymerizable moiety. Other metal alkoxides can be incorporated into glass layers and are also considered to be inorganic polymerizable moieties. Examples include tetraalkylsiloxanes, which can be partially and/or totally hydrolyzed, and mixtures of tetraalkylsiloxanes and partially and/or totally hydrolyzed versions thereof. Examples of suitable tetraalkoxy silanes include tetramethylorthosilicate (TMOS), tetraethylorthosilicate (TEOS) and tetrapropylorthosilicate (TPOS), which, upon acid hydrolysis, become incorporated into the organic/inorganic layer along with the coupling agent.

Triethylborate (TEB) or boric acid may be substituted for the TMOS, TEOS or TPOS in amounts from 0.25 to 1.5% by weight of TMOS, TEOS or TPOS in order to increase the useful lifetime of the coating solution. Other metal alkoxides can be used to vary the properties of the wear surface protective coating as long as they are compatible with the sol-gel process.

Basically, an alkyl-O-silane group is converted to an Si—O—H group by acid or base hydrolysis, and the Si—O—H groups polymerize to form Si—O—Si linkages. Each silicon atom in the polymer includes at least one oxygen bond, and can include two, three or four oxygen bonds. Various metal alkoxides can also react with and become incorporated in the inorganic polymer. The coupling agents can cross link into the polymer if they include at least two such groups and can be incorporated into the polymer network if they include at least one such group.

Additionally, colloidal metal oxide sols such as silica sols can be used in combination with coupling agents to make organic/inorganic top coatings. Examples include those described in U.S. Pat. Nos. 4,644,077 and 5,559,163, the contents of which are hereby incorporated by reference in their entirety.

Organic Polymerizable Monomer/Oligomer

Organic polymerizable monomers are well known to those of skill in the art, and include an organic polymerizable moiety, for example, an olefinic group, an epoxy group, and the like. When the polymerizable moieties are polymerized, they form an organic polymer. Similar moieties in the coupling agent incorporate the coupling agent into and/or form an organic polymer layer. Olefinic groups include vinyl ethers, vinyl, allyl, (meth)acrylate, acetylenic, etc.

As used herein, the distinction between monomers and oligomers is that oligomers tend to include a plurality, typically more than about 2 and less than about 100, repeating units.

In one embodiment, the organic polymerizable monomer and/or oligomer includes one or more reactive functional groups which polymerize under similar polymerization conditions as the polymerizable organic groups on the coupling agent. In this embodiment, the monomer and/or oligomer can react with the coupling agent while the organic portion of the organic/inorganic top coat layer is being formed. However, in another embodiment, the organic reactive functional groups in the coupling agent and the monomer and/or oligomer can polymerize under different reaction conditions. An example of this is where an epoxy group is present in the coupling agent and the monomer includes (meth)acrylate groups.

Examples of suitable epoxy monomers include ERL-4221 (Union Carbide), also known as CY-179 (Ciba-Geigy), 3,4-epoxycyclohexyl-3,4-epoxycyclohexane carboxylate, ERL-4299 (Union Carbide), also known as CY-178 (Ciba Geigy)-Bis(3,4-epoxy-6-methyl cyclohexyl) adipate, ERL-4201 (Union Carbide)-3,4-epoxy-6-methyl cyclohexanmethyl-3,4-epoxy-6-methylcyclohexane carboxylate, ERL-4206 (Union Carbide), also known as RD-4 (Ciba Geigy)-vinylcyclohexenedioxide, and DECO (Aldrich)-1,2,5,6-diepoxycyclooctane. A particularly useful epoxide is ERL-4221 available from Union Carbide.

Vinyl monomers such as triethylene glycol divinyl ether can also provide excellent gloss protection and stain resistance equivalent to the epoxy monomers. Acrylate or vinyl monomers such as described in U.S. Pat. Nos. 2,760,863; 2,791,504; 2,927,022; 3,261,686; or 3,380,831, the contents of which are hereby incorporated by reference, can be used solely or in combination with epoxy monomers depending on the degree of hardness desired for the protective coating.

Initiators

Photoinitiators

Mixtures of monomers may necessitate having mixtures of photoinitiators for both cationic and free radical types of polymerization. Free radical photoinitiators such as benzoin ethers, benzophenone and the like are well known to those of skill in the art. For cationic polymerization of epoxy and other such groups there are commercially available photoinitiators which produce an acid catalyst capable of initiating epoxy polymerization based on aryliodonium, arylsulfonium or aryldiazonium compounds. These include diphenyliodonium hexafluorophosphate and bissulfide-bis-hexafluorophosphate.

Others

Other initiators can be employed to react the organic moieties of the coupling agent and organic monomer materials. These can include well known thermal initiators that initiate free radical polymerization, or other catalysts for cationic or anionic polymerization/reaction of the coupling agent moiety with the organic monomer, or the polymerization of the coupling agent and organic monomer. If the organic moieties are cross-linked via e-beam radiation, then no initiator may be required. The important factor is that the coupling agent is chemically reacted into both organic and inorganic polymer networks.

Surfactants

A surfactant can be conveniently employed in the coating composition. Suitable surfactants include: Triton® X-100 from Rohm and Haas, Surfynol 104-E from Air Products, Aerosol OT from American Cyanamid, FC-120 from 3M, and Tergitol NP-27 from Union Carbide. Examples include silicone oil surfactants such as poly(dimethylsiloxane), which can provide the top coat layer with superior stain and gloss protection.

Substrates

Substrates for flooring are well known in the art and include a solid, filled or unfilled polymeric layer or composite, a solid layer composite comprising a fibrous web saturated with polymeric binder, and porous fibrous layers such as beater saturated felts, and non-woven fabric materials.

In one embodiment, the substrate comprises a PVC plastisol. In another embodiment, the substrate is a porous material. In an additional embodiment, the substrate is a felt.

Flooring Structures

Flooring structures are also well known in the art and can include single or multiple layers in the form of tile or sheet. They can also include solid and foam layers. They can be made from melt processing techniques, and in the case of PVC plastisols, wet coating processing techniques. Flooring structures also mean any single or multiple layer typically used in flooring products. The flooring structures can include one or more of a calendered polyvinyl chloride (PVC) layer, a foamable PVC plastisol layer and a design layer.

In one embodiment, the floor product includes a substrate of porous felt material, a PET wear layer, an adhesion promoter overlying the PET wear layer (i.e., a "primed" PET wear layer), and an organic/inorganic top coat layer overlying the primed PET wear layer. The product can also include a flooring structure in contact with the felt layer, the flooring structure including a calendered PVC basecoat in direct contact with the felt layer, a foamable PVC plastisol in contact with the basecoat, and a design layer in contact with the foamable PVC plastisol layer.

In another embodiment, the floor product comprises a melt processed, filled resilient tile flooring structure, a PET wear layer, an adhesion promoter on one surface of the PET wear layer in contact with the tile flooring structure, and additional adhesion promoter on the second surface of the PET wear layer, and an organic/inorganic top coat layer overlying the second surface of the PET wear layer. The floor product can be in the form of a tile or sheet material.

Sol Gel Transformation

The term polymerization is often used in sol-gel processing to describe the transformation of the sol phase to the gel/glass phase, since glass is a polymer. However, it is probably more correct to think of the gel-to-glass conversion as an aggregation step during which discrete oxide particles of small size (typically in the range of 4 nm for acid catalyzed silicon alkoxides) form and are chemically bonded to one another. This contrasts with the molecular polymerization concept where each functional group is reacted to form either a linear or three dimensional network.

Glasses prepared from acid-catalyzed sol-gel processes form clear, hard films due to the extremely small sizes of the aggregated oxide particles. Sol-gel derived glasses can rival the performance of traditional glasses. Silicon alkoxides are by far the easiest alkoxides from which such glasses can be formed. Tetraalkoxysilanes such as tetraethylorthosilicate (TEOS) and tetramethylorthosilicate (TMOS) are readily hydrolyzed at a pH of around 2 and condense upon evaporation of solvent to give approximately 90% yield of pure silica as determined by IR (powder dried 2 hrs. at 150 C.). If the hydrolysis product is left in solution and the solution sufficiently concentrated, a gel will form in 24–72 hours.

Optionally, glasses can also be obtained by basic catalysis of silicon alkoxides. The sol gel chemistry described herein applies whether a coupling agent alone is used to prepare the sol gel glass, or whether other inorganic polymerizable moieties are present.

The alkoxysilanes in the coupling agent present in the top coat formulation can be hydrolyzed by adding water and an acid catalyst. The amount of water added determines the degree of hydrolysis in the final product. The coupling agent can include a certain degree of hydrolyzed siloxanes (i.e., siloxide groups).

The sol-gel processing conditions can be controlled to optimize various physical properties of the resulting glass. For example, one can control the particle size in the gels, which can optimize the optical clarity. The toughness of the glass can be varied, for example, by using appropriate combinations of borosilicate, zirconia/silica and other metal alkoxides. The organic monomers can be selected to provide hybrid inorganic/organic materials with desired properties.

Generally, any of the metal alkoxides based upon Al, Zr, Si, or Ti will readily form oxides after hydrolysis and solvent removal. Typically, the acid hydrolysis/condensation reactions of metal alkoxides are run using a stoichiometric amount of water and at a pH of about 2. This procedure works well for the silicon and aluminum alkoxides but other alkoxides such as zirconium and titanium can require a very low pH or slow hydrolysis reactions to maintain a reasonable stability.

Methods of Forming the Top Coat Layer

The general scheme for producing a polymer/glass hybrid is: (1) optionally preparing a hydrolyzed metal alkoxide in solution, (2) preparing a hydrolyzed coupling agent (i.e. bifunctional or polyfunctional including at least one trialkoxysilane functionality and at least one polymerizable organic functionality) in solution, and after mixing the above, (3) optionally including a polymerizable monomer, (4) including an appropriate initiator, (5) including a surfactant if desired, (6) coating on a clear, protective layer (7) drying, and polymerizing the organic and inorganic networks. In one embodiment the polymerization of the organic network is achieved by exposing the dried top coat layer to a source of actinic radiation, for example, ultraviolet or e-beam energy.

In those embodiments where the top coat layer includes inorganic metal oxide polymerizable moieties such as tetraalkoxysilanes and organic polymerizable moieties in addition to the coupling agent, the top coat layer can be formed by:

(a) producing a hydrolyzed solution comprising:
  (i) a metal alkoxide;
  (ii) a coupling agent having at least one reactive organic substituent;
(b) adding an organic monomer to the hydrolyzed solution, along with a suitable polymerization initiator;
(c) applying the composition in a dry thickness ranging between about 1 and about 13 microns over a clear, polyethylene terephthalate wear layer;
(d) drying the composition to remove solvent; and
(e) curing the composition.

The coating may be cured by any suitable means including heat or ultraviolet light irradiation that is compatible with the reactive groups in the top coat formulation and/or the polymerization initiator.

In another embodiment the inorganic portion of the organic/inorganic composition results from only the presence of the coupling agent.

In one embodiment the PET wear layer overlies a substrate such as a tile, sheet flooring, table top, panel, or similar article of manufacturer before step c above is carried out. In another embodiment, the PET inorganic/organic composite film is laminated to a substrate after it has been formed.

In some embodiments, the inorganic polymerizable and/or organic polymerizable monomers can be absent from the coating composition. In these embodiments, the above steps can take place, without the presence of these components.

In one embodiment, the organic/inorganic layer is formed by applying a top coat formulation including the acid-catalyzed hydrolysis product of at least one silicate (i.e., tetramethylorthosilicate, tetraethylorthosilicate or tetrapropylorthosilicate), the acid-catalyzed hydrolysis product of an epoxy/silane coupling agent; and a suitable organic monomer, to the PET wear layer. The inorganic portion of the organic/inorganic layer is cured by removing the solvent and heating the top coat layer. The organic portion of the organic/inorganic layer is cured by polymerizing the organic monomer. If the organic monomer is an olefin-containing material, the polymerization can involve exposure to actinic radiation, optionally in the presence of a photoinitiator. If the organic monomer is an epoxy group, polymerization can be effected using any conventional initiator known to initiate polymerization of epoxy groups, including initiators including thiol and/or hydroxy groups, as well as cationic catalysis which can include cationic photoinititators.

Ideally, the organic functionality of the coupling agent and the organic functionality of the monomer are reactively compatible.

Methods for Improving Interlayer Adhesion

To function as a flooring material, the PET/(organic/inorganic) composite material must adhere to the substrate. Also, the PET wear layer must adhere to the organic/inorganic top coat layer. Various adhesion primers and surface treatments can be used to gain adhesion, if required, and are selected based upon the substrate and flooring material. These can include multilayer extruded or laminated PET films, or PET films with adhesion primer coating layers. PET film with adhesion promoters are well known and commercially available. One preferred PET supplier is DuPont Teijin Films who offer a wide variety of adhesion promoters.

Methods of Applying the Composite Wear/Top Coat Layers

The wear/top coat layer can be applied by laminating a PET film to floor covering component (including, for example, a substrate, foam layer and design layer). The top coat formulation can be subsequently applied by any convention means of application, the solvent evaporated to effect the inorganic polymerization, and then the organic component subjected to appropriate polymerization conditions, for example, UV cure.

In another embodiment, the method involves moving a substrate using rolls adapted to carry the substrate, moving a PET film using rolls adapted to carry the PET film, wherein the substrate and the PET film are heated and laminated together. The temperature, dwell time, and the pressure applied to the substrate/PET film composite are adjusted to provide adhesion between the two layers after cooling. The interlayer adhesion can be improved, if necessary by applying an adhesion promoter to the substrate or the PET film before the PET film is applied.

An adhesion promoter can be applied to the PET film layer, if necessary, to promote adhesion to the organic/inorganic layer. Then, the top coat formulation can be applied and cured.

The substrate and the PET barrier layer film can be pre-heated before contacting each other, for example, using a radiator disposed adjacent to the path the substrate travels before it contacts the PET film. The PET film itself can also be preheated using a radiator disposed adjacent to a path the PET film travels before it initially contacts the substrate.

In one embodiment, a PET wear layer film is laminated to a flooring structure or substrate, the top coat layer applied over the PET wear layer to form a floor covering component, or a completed flooring covering. It is important is that the PET film layer have adequate adhesion to both the flooring structure/substrate and the top coat layer.

In another embodiment, the PET film is coated with the inorganic/organic top coat layer and the composite film laminated to a flooring structure or substrate.

Referring to now to FIG. 1, showing a schematic drawing of a particular embodiment of the floor covering described herein, a typical flooring structure 102 is illustrated that includes a felt substrate 104, a calendered PVC basecoat 106, a foamable PVC plastisol 108, an optional clear PVC layer 109, a polyethylene terephthalate (PET) wear layer 110, and an organic/inorganic layer 112 adhered to the PET wear layer. The PET wear layer 110 can include and an adhesion promoter on one or both surfaces.

Figure 2:
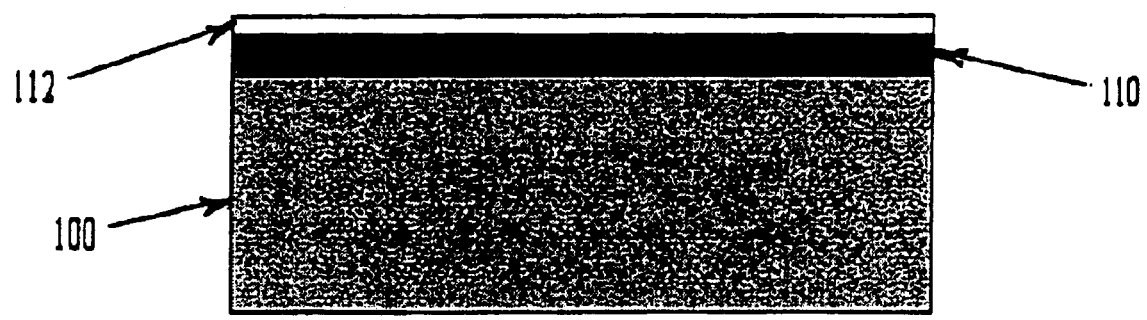

Referring to FIG. 2, showing a schematic drawing of a particular tile embodiment of the floor covering described herein, a typical tile structure is illustrated which includes a melt processed, calendared filled polymer tile layer such as Armstrong's Excellon Tile (100), a polyethylene terephthalate (PET) wear layer 110, and an organic/inorganic layer 112 adhered to the PET wear layer. The PET wear layer can include an adhesion promoter on one or both surfaces.

The following examples are intended to illustrate the invention and it is thought variations will occur to those skilled in the art. Accordingly, it is intended that the scope of the invention should be limited only by the appended claims.

EXAMPLES

Example 1

An organically modified sol-gel formulation (O/I) as prepared in a similar fashion to that described in Example 1 of U.S. Pat. No. 5,120,811 was sprayed onto Dupont Teijin film (identified as Melinex 617/500) that was pretreated with a proprietary acrylic polymer and taped to a tile blank. The treated film taped to a tile carrier was passed through an infrared oven (Glenro) to remove solvent. The exit surface temperature of the coated film/carrier was 137° F. This structure was subsequently UV cured at a dose of 1.1 Joules/cm$^2$ to give good cure. Coating thickness is estimated to be between 2–6 $\mu$ms based on co-weights.

Using the flat bed press Wabash, the top platumin was heat to 310° F. and bottom left at 90° F. A sandwich was prepared in which the PET-organic/inorganic coated film sample was placed on a tile blank. A smooth chrome plate placed on top of the coated film/tile and silicon pad on top of chrome plate. This structure was placed on top silicon belt piece on top of a steel plate. The entire sandwich was placed in the Wabash press and pressed at 20 tons for 3 to 5 minutes. The press was opened and the sample allowed to cool prior to removal.

Table 1 contains comparative results for stain and gloss protection for the invention versus uncoated tile.

TABLE 1

| Test Sample | 30 Min. % gloss retained | 60 Min. % gloss retained | 90 Min. % gloss retained |
|---|---|---|---|
| Control Melinex 617/500 | 46 | 27 | 17 |
| Invention | 98 | 85 | 63 |

Example 2

Coatings were prepared as in Example 1 except that pretreated double side Melinex 582/400 film was used.

| Test Sample | 30 Min. % gloss retained | 60 Min. % gloss retained | 90 Min. % gloss retained |
|---|---|---|---|
| Melinex 582/400 invention | 99 | 94 | 86 |

Example 3

Further benefit of this invention can be realized by the addition of micron size aluminum oxide to the thin hard coating. Coatings were prepared as in Example 1 except that aluminum oxide having an average size of 0.2–0.4 microns (Bawkowski E600) was added (10 gms/Qt Example 1) and Melinex 725/500 was used. Tile samples were prepared in an identical fashion to that described in Example 1.

Table 3 contains comparative results for stain and gloss protection for the invention versus uncoated tile.

TABLE 3

| Test Sample | 30 Min. % gloss retained | 60 Min. % gloss retained | 90 Min. % gloss retained |
|---|---|---|---|
| Control Melinex 725/500 | 51 | 31 | 21 |
| Invention Example 2 | 98 | 90 | 77 |

Example 4

Samples of O/I (organic/inorganic) coated and uncoated Melinex films on tile were prepared as per Example 1, and subjected to Light Stability testing using ASTM F1515-98. Data was obtained after 400 hours of exposure and is listed in Table 1.

TABLE 1

| T-626457 | Tile Sample | Xenon Test ASTM F1515-98 Delta b Cool White Fluorescent |
|---|---|---|
|  | Xenon exposure (hours) | 400 |
| 1 | Melinex 617/500 Coated | 1.262 |
| 5 | Melinex 617/500 | 1.134 |
| 2 | Melinex 582/400 Coated | 0.704 |
| 6 | Melinex 582/400 | 1.311 |
| 3 | Melinex 725/500 Coated | 1.925 |
| 7 | Melinex 725/500 | 1.276 |
| 4 | Melinex 6445/500 Coated | 2.915 |
| 8 | Melinex 6445/500 | 2.754 |

All samples showed little discoloration with Delta b values below 3 units.

While specific embodiments have been set forth as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope and no undue limits should be imposed except as set forth in the following claims.

What is claimed is:

1. A composite wear layer comprising:
   a) a polyethylene terephthalate wear layer,
   b) an organic/inorganic top coat layer formed from a top coat formulation comprising (1) a coupling agent having an organic polymerizable moiety and an inorganic polymerizable moiety and (2) a tetraalkylsiloxane, and
   c) an adhesion promoter between the wear layer and the top coat layer.

2. The composite wear layer of claim 1, wherein the thickness of the wear layer is between about 1 mil and about 20 mils.

3. The composite wear layer of claim 1, wherein the thickness of the top coat layer is between about 2 microns and about 13 microns.

4. The composite wear layer of claim 1, wherein the top coat layer further comprises hard particles.

5. The composite wear layer of claim 4, wherein the hard particles are nanoparticles.

6. The composite wear layer of claim 1, wherein the wear layer comprises a polyethylene terephthalate copolymer.

7. The composite wear layer of claim 1, wherein the organic/inorganic top coat was formed from a top coat formulation comprising a colloidal inorganic sol.

8. The composite wear layer of claim 1, wherein the organic polymerizable moiety is selected from the group consisting of (meth)acrylate, epoxy, isocyanate, vinyl ether, allyl, vinyl, and acetylenic.

9. The composite wear layer of claim 1, wherein the inorganic polymerizable moiety is selected from the group consisting of hydrolyzable Al, Zr, Si, Ti or B alkoxides and mixtures thereof.

10. The composite wear layer of claim 1, wherein the organic/inorganic top coat composition was formed from a top coat formulation further comprising (3) an organic polymerizable monomer or oligomer.

11. The composite wear layer of claim 10, wherein the coupling agent comprises a reactive organic moiety that reacts with the organic polymerizable monomer, but is not capable of self polymerization.

12. The composite wear layer of claim 1, wherein the organic/inorganic top coat has been cured by heat, UV radiation, electron beam radiation or combinations thereof.

13. A surface covering comprising the composite wear layer of claim 1 and a substrate.

14. The surface covering of claim 13, wherein the surface covering is a floor covering.

15. The surface covering of claim 14, wherein the floor covering is a resilient tile.

16. The surface covering of claim 14, wherein the floor covering is a resilient sheet product.

17. The surface covering of claim 16, wherein the resilient sheet product comprises a foam or foamable layer.

18. The surface covering of claim 14, wherein the substrate is a flooring substrate and the flooring substrate further comprises a second adhesion promoter between the wear layer and the flooring substrate.

19. The surface covering of claim 18, wherein the adhesion promoter between the wear layer and the top coat layer is different from the adhesion promoter between the wear layer and the flooring substrate.

20. The composite wear layer of claim 1, wherein the glass transition temperature of the organic/inorganic top coat layer is above 25° C.

21. The composite wear layer of claim 1, wherein the Mohs hardness of the top coat is greater than 1.5.

22. The floor covering of claim 14, wherein the final product exhibits gloss retention properties of greater than 90%.

23. The floor covering of claim 14, wherein the final product exhibits a light stability color change of less than 3 Delta b units.

24. A process of manufacturing a floor covering, comprising:
  a) laminating a PET film to a flooring substrate,
  b) applying an adhesion promoter to the PET film before or after the PET film is laminated to the flooring substrate whereby the PET film is interposed between the adhesion promoter and the flooring substrate with the adhesion promoter being exposed when the PET film is laminated to the flooring substrate and the adhesion promoter is applied to the PET film,
  c) applying an organic/inorganic top coat formulation comprising (1) a coupling agent having an organic polymerizable moiety and an inorganic polymerizable moiety and (2) a tetraalkylsiloxane to the exposed adhesion promoter, and
  d) then curing the top coat formulation.

25. The process of claim 24, wherein the adhesion promoter is applied to the PET film before the PET film is laminated to the flooring substrate.

26. The process of claim 24, wherein a second adhesion promoter is applied to at least one of the PET film and the flooring substrate before the PET film is laminated to a flooring substrate.

27. The process of claim 26, wherein the adhesion promoter on one side of the PET film is different from the adhesion promoter on the other side of the PET film.

28. The process of claim 24, wherein the PET film comprises a copolymer of polyethylene terephthalate.

29. A process of manufacturing a floor covering, comprising:
  a) applying an organic/inorganic top coat formulation comprising CD a coupling agent having an organic polymerizable moiety and an inorganic polymerizable moiety and (2) a tetraalkylsiloxane, to a PET film to form a composite wear layer, and
  b) laminating the composite wear layer to a flooring substrate such that the PET film is overlying the flooring substrate and the organic/inorganic top coat is exposed when the flooring covering is installed.

30. The process of claim 29, wherein the PET film further comprises an adhesion promoter.

31. The process of claim 30, wherein the top coat formulation is applied to the adhesion promoter.

32. The process of claim 30, wherein the adhesion promoter is between the PET film and the flooring substrate when the composite film is laminated to the flooring substrate.

33. The process of claim 31, wherein a second adhesion promoter is between the PET film and the flooring substrate when the composite film is laminated to the flooring substrate.

34. The process of claim 33, wherein the adhesion promoter comprising the PET film is different from the second adhesion promoter.

35. The process of claim 29, wherein the PET film comprises a copolymer of polyethylene terephthalate.

36. The surface covering of claim 13, wherein the PET wear layer comprises a copolymer of polyethylene terephthalate.

* * * * *